United States Patent [19]
Kistler

[11] 4,064,744
[45] Dec. 27, 1977

[54] STRAIN SENSOREXTENSIOMETER

[75] Inventor: Walter P. Kistler, Redmond, Wash.

[73] Assignee: Kistler-Morse Corporation, Bellevue, Wash.

[21] Appl. No.: 692,977

[22] Filed: June 4, 1976

[51] Int. Cl.² .......................... G01B 7/16; G01L 1/22
[52] U.S. Cl. .............................. 73/88.5 R; 73/141 A; 338/6
[58] Field of Search .................. 73/88.5 R, 141 A; 338/5, 6

[56] References Cited

U.S. PATENT DOCUMENTS

| | | | |
|---|---|---|---|
| 2,561,318 | 7/1951 | Ruge | 73/141 A X |
| 2,801,388 | 7/1957 | Ruge | 73/88.5 R X |
| 3,221,283 | 11/1965 | Ziggel | 73/88.5 R X |
| 3,559,467 | 2/1971 | Gurol et al. | 73/141 A X |
| 3,743,041 | 7/1973 | Videon | 177/211 X |

FOREIGN PATENT DOCUMENTS

| | | | |
|---|---|---|---|
| 1,421,107 | 11/1965 | France | 73/141 A |
| 988,667 | 5/1951 | France | 73/141 A |

OTHER PUBLICATIONS

NBS Technical News Bulletin, vol. 42, No. 7, 7/1958, pp. 134–137.

*Primary Examiner*—Charles A. Ruehl
*Attorney, Agent, or Firm*—Seed, Berry, Vernon & Baynham

[57] ABSTRACT

A strain sensor or extensiometer with electrical output designed to measure relative displacements between two axially spaced points on a stressed structure comprising an elongated body with two end sections and a centrally located flexible beam extending in a direction perpendicular to the longitudinal axis of the sensor body. Relative displacements of the end sections generate two opposing symmetrical torques at the ends of the beam. These torques or bending moments are impressed onto the beam through two sets of flexible bridges which are symmetrically located but unequally spaced on opposite sides of the beam. These two torques or couples cause the beam to bend evenly over its entire length. Resistance strain gages bonded to both sides of the beam at its center measure this bending.

11 Claims, 6 Drawing Figures

STRAIN SENSOREXTENSIOMETER

BACKGROUND OF THE INVENTION

Field of the Invention

This invention generally relates to strain measuring instruments or extensiometers, which generate an electrical signal output, and more particularly, to such instruments used to measure loads and forces in load carrying structures.

Electrical strain sensors have been known for many years and are being used to detect large stresses and overloads in cables, machine structures, frames of hydraulic presses and the like. Attempts have also been made to use such instruments in weighing applications, where the contents of large containers or silos are being monitored by measuring strains at certain locations in the supporting structure. However, such attempts have always failed because the strain levels in such structures are usually very low, in the order of a few tens of microstrains. Existing strain sensors either do not have sufficient sensitivity to obtain useful results or the signal output is too much affected by extraneous factors like temperature and temperatue gradients, electrical noise and ground loops.

Errors caused by such influences can be considerably reduced by using a perfectly symmetrical arrangement of the electrical sensing elements and by connecting them in a balanced bridge circuit where one element is subjected to tension, the other to compression. The effects of outside disturbances then cancel each other out, while the effects to be measured are adding up. Furthermore, in order to minimize temperature effects, the two balanced strain sensitive resistors in the bridge circuit should be located in very close proximity to each other. They will then be subjected to equal temperatures even in cases where the outside temperature is changing rapidly and large temperature gradients do exist.

The design according to the invention achieves such nearly perfect symmetry by arranging the two sensing elements or strain gages in a central location on both sides of a slender metallic beam and electrically connecting them in a balanced bridge circuit. No appreciable temperature differences can develop across such a beam and temperature gradients along the length of the beam will affect both strain gages equally. On the other hand, any bending of the beam will put one strain gage into compression and the other strain gage into tension and will change their resistances differentially, thus causing an imbalance in the bridge circuit and generating an electrical signal. Even bending of the beam over its entire length is achieved by exerting two equal and opposite torques or couples at its ends. This is achieved by arranging two symmetrically but unevenly spaced pairs of flexible bridges near the ends of the beam which connect the beam to the two end sections of the instrument. Any motion of the one end section towards or away from the other will induce a rotational motion at the ends of the beam and cause it to evenly bend over its entire length.

In order to obtain a highly sensitive instrument, the strain gages used will preferably be of the conventional semiconductor type. These strain gages consist of fine fibers cut from a single silicon crystal. Such semiconductor strain gages have gage factors which are 50 to 80 times higher than those of metal foil gages, resulting in much higher sensitivity of the instrument. However, semiconductor strain gages are also highly temperature sensitive. A temperature change in the order of 20° F. can result in a resistance change of about 10%, which does amount to the resistance change obtained under full load. It is obvious, therefore, that the two active elements in a semiconductor circuit have to be kept at exactly the same temperature. This can be best achieved by locating those strain gages in closest proximity, separated only by a thin layer of material of high thermal conductivity, like a metal for instance. This is the case in the design of this invention where the two strain gages are located exactly opposing each other at the two sides of a slender beam. The two gages will also have to be made of exactly the same material, have the same physical dimensions and the same electrical properties.

DESCRIPTION OF THE DRAWINGS

1 & 2 are the end sections of the instrument, 3 is the flexible beam which is attached to the end sections through the two pairs of flexible bridges 4,4' and 5,5'. The flexible beam 3 carries a pair of matched semiconductor strain gages 6 and 7. The end sections 1 & 2 each show a mounting hole 8 & 9 which enables the instrument to be mounted on the test structure 10 by means of mounting bolts 11 and 12. Contact ridges 13 and 14 are provided at the ends of the instrument to ensure good mechanical contact between instrument and test structure and to keep the instrument body from contacting irregularities of the surface. Notches 15, 15'; 16, 16' and 17, 17' have been machined into the flexible bridges at the location where they attach to the flexible beam in such a way, as to create localized areas of thin cross section and very high flexibility which act as flexure pivots. This permits the beam to bend more freely and thus improves the sensitivity and linearity of the instrument. Furthermore, the notches are so designed that the centers "$a$" of the spring pivots lie inside of the outline of the beam and as close to the neutral axis "$c$" of the beam as possible. FIG. 3 shows an enlarged view of the two spring pivots at one end of the flexible beam. If the spring pivots were located at a greater distance from the neutral axis of the beam, any lateral disturbance force, as could arise from clamping or from thermal effect, would be translated into bending forces on the beam and would thus cause an error in the output signal. The effective thickness "$t$" of the beam in the instrument's longitudinal direction is less at the ends of the beam because of the closeness of the spring pivots to the beam neutral axis. It is necessary however that the beam deflect at its midpoint. Therefore to compensate for the reduced beam thickness at its ends the center of the beam is of a reduced width "$w$." The cross sectional area at the midpoint of the beam is thus less than the cross sectional area at the ends of the beam. Preferably the sensitivity of the instrument is increased by reducing the width of the central portion of the beam to obtain a smaller cross sectional area thus increasing the compliance of the beam without reducing the separation of the two strain responsive resistive elements. This is desirable since the level of strain increases proportionately to the distance of the elements from the beam neutral axis.

Figure 2:
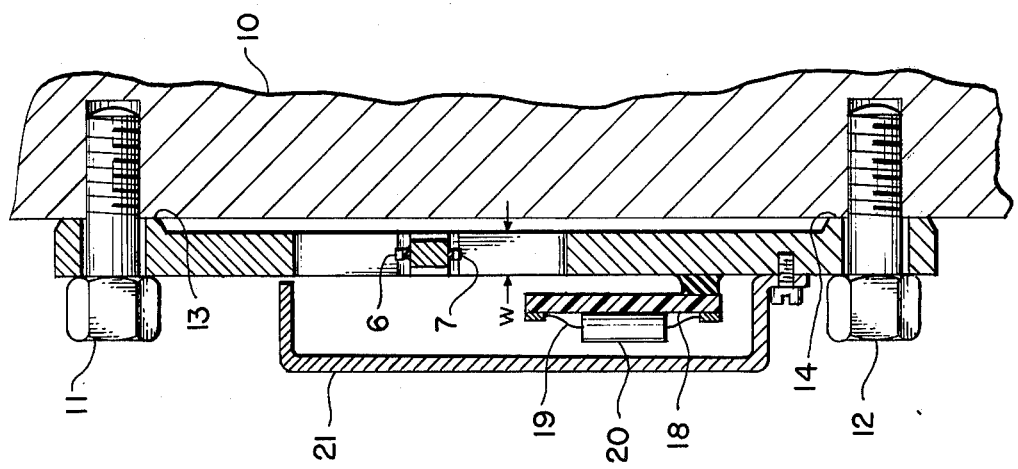
FIG. 2 shows a longitudinal cross-section.

Strain sensing elements 6 and 7 are bonded to each side of the beam near its center. They consist of a matched pair of fine silicon fibers, cut from a single crystal of slightly doped silicon. These fibers typically have a square cross section of 0.006×0.006 inch and are about ¼ inch long. They are bonded to the beam by fusing at high temperature in a glassy ceramic. By fusing the fibers in ceramic rather than bonding them with an organic epoxy cement, exeptional stability, long-life and resistance to environmental factors is achieved.

A small printed circuit board 18 is attached to one of the end sections and is connected to the silicon strain gages through thin aluminum wires 19. This board carries a number of resistors 20 in a conventional circuit used for improved temperature compensation and for a better zeroing of the output signal. Since the instrument will often be used in outdoor installations, it has to be protected from humidity and from chemical contamination, without in any way restricting the motion of the flexible beam. A thin, but tough, coating of a plastic sealant is applied on all electrical parts and connections. Furthermore, a protective cover 21, attached to one of the end sections only, provides added mechanical protection.

Figure 1:
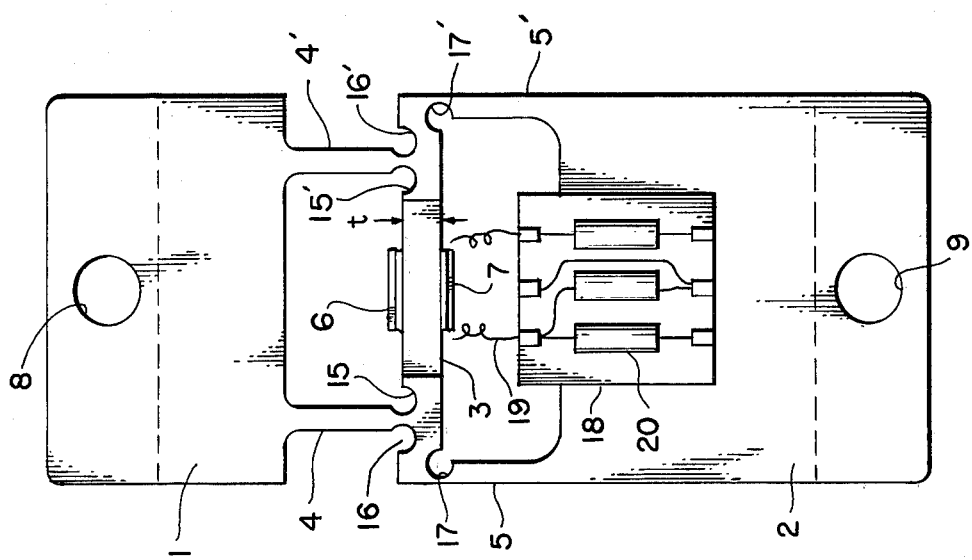
FIG. 1 shows the front view of the instrument.
Figure 3:
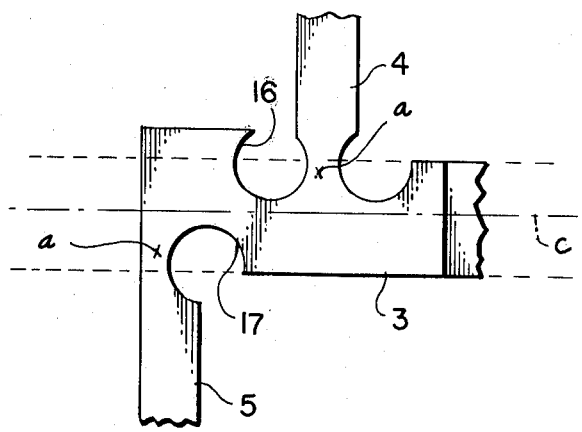
FIG. 3 is an enlarged fragmentary front elevation.

FIG. 1 shows the most common embodiment of the invention, where the instrument is machined from a solid metal bar. However, other embodiments are possible and may offer advantages in certain applications.

Figure 4:
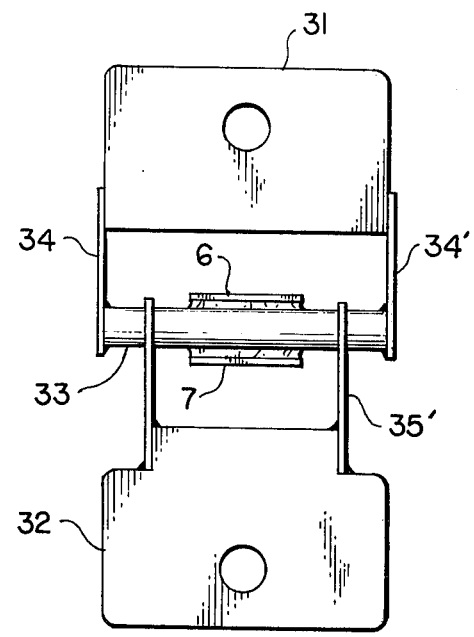
FIG. 4 is a front elevation of a modified form of strain sensor.

FIG. 4 shows an instrument that instead of being machined from a solid bar is assembled from different pieces through procedures like welding, brazing, soldering, or cementing. The flexible beam may consist of a straight round metal bar 33 which is connected to the two end sections 31 and 32 through flexible flat steel springs 34—34', 35—35'. One pair of springs with wide spacing may be welded to one of the end sections and to the ends of the flexible bar. The other set of springs may have a hole at one end to accept the round bar. They may be welded to a projection of the second end section at their other end.

Figure 5:
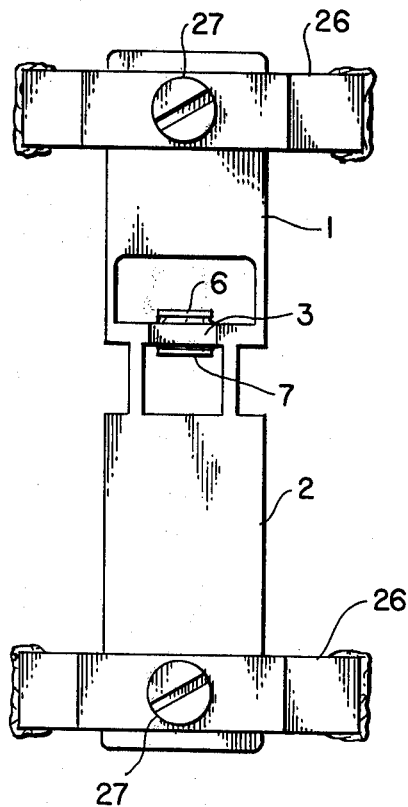
FIG. 5 is still a second modification.
Figure 6:
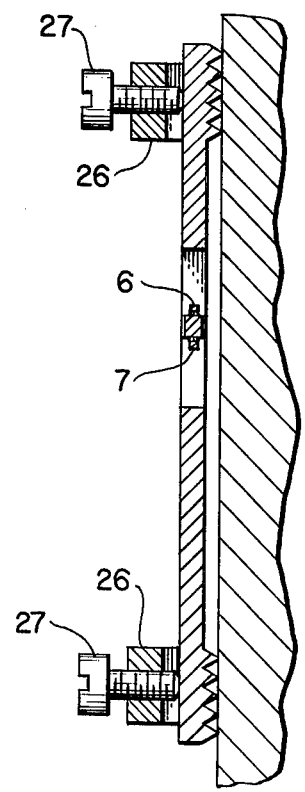
FIG. 6 is an end elevation of the sensor shown in FIG. 5.

In order to measure the stresses in a structure, the strain sensors will have to be solidly attached to such structure at both ends. This can be done through bolting the instrument to the structure as shown in FIG. 1. However, other ways to attach the instrument may be preferred in certain applications. FIG. 5 shows how an instrument of the type shown in FIG. 1 but without mounting holes can be clamped to the structure through brackets 26 that are welded or bolted to the structure and through set screws 27.

Extreme temperature and temperature changes do normally cause major problems in making strain measurements. In order to alleviate these problems, the instrument itself has to be perfectly temperature compensated, which means that its thermal zero shift, as well as its thermal sensitivity shift have to be reduced to a small value. This, however, may not yet solve the problem. If the instrument is mounted on a structure which has a thermal expansion different from the thermal expansion of the instrument itself, stresses will occur and lead to measuring errors. In order to avoid this, the coefficient of thermal expansion of the structure under study has to be known and the instrument itself built from a material which will closely match this coefficient.

The embodiments of the invention in which a particular property or privilege is claimed are defined as follows:

1. A strain measuring instrument with electrical output, comprising two end sections through which the instrument can be attached to a structure and a mid-section including a beam arranged substantially perpendicular to the instrument axis and mechanically connected to the end sections through two pairs of symmetrically arranged but unequally spaced flexible bridges and carrying at least two strain responsive resistive elements, said end sections and beam being integrally formed by a solid metal bar having a generally rectangular cross section.

2. A strain measuring instrument according to claim 1, where the instrument is built from a material with substantially the same thermal expansion as the structure it will be mounted on.

3. A strain measuring instrument according to claim 1, where a number of notches are provided on the flexible bridges so as to build localized areas of greatest flexibility.

4. A strain measuring instrument according to claim 3, where the notches are made in such a way that the resulting flexures are located near the axis of the beam and within the outline of the mid-section of this beam.

5. A strain measuring instrument according to claim 1 further including a pair of spaced apart brackets rigidly secured to said structure with each of said brackets overlying one of said end sections, and fastening means carried by said brackets for forcing the respective end sections of said instrument against said structure thereby frictionally securing said end sections to said structure.

6. A strain measuring instrument according to claim 5 wherein a surface of each end section facing toward said structure contains a plurality of transverse ridges for increasing the frictional force between said structure and end sections in a longitudinal direction.

7. A strain measuring instrument according to claim 1, where the two strain responsive resistive elements are a pair of semiconductor strain gages.

8. A strain measuring instrument according to claim 7, where the two strain responsive resistive elements are a pair of matched strain gages consisting of thin fibers cut from a single silicon crystal and bonded to the beam through fusing in a ceramic bonding agent.

9. The strain measuring instrument of claim 1 further including compensating means integrally attached to one of said end sections, said compensating means being operatively connected to said strain responsive resistive elements for generating an externally accessible output corresponding to the deflection of said beam such that the external operating characteristics of a variety of beams and resistive elements having variable operating characteristics may be standardized.

10. A strain measuring instrument comprising a beam having opposite ends, and a neutral axis of deflection along its length, force transmitting means connected to the opposite ends of the beam for producing oppositely directed couples on the ends so that the beam assumes a uniform curvature upon application of the forces, transducer means on opposite sides of the beam midway between said force transmitting means for sensing strain within said beam when deflected, means for rigidly connecting said force transmitting means to an object, and compensating means integrally attached to one of said end sections, said compensating means being operatively connected to said transducer means for generating an externally accessible output corresponding to the deflection of said beam such that the external operating characteristics of a variety of beams and transducer means having variable operating characteristics may be standardized.

11. A strain measuring instrument with electrical output, comprising two end sections through which the instrument can be attached to a structure and a mid-section including a beam carrying at least two strain responsive resistive elements, said beam being arranged substantially perpendicular to the instrument axis and mechanically connected to the end sections through two pairs of symmetrically arranged but unequally spaced flexible bridges, said beam further including a pair of notches formed in said beam on opposite sides of each bridge where said bridges intersect said beam thereby forming flexure pivots between said beam and bridges and placing the centers of said pivots toward the neutral axis of said beam.

* * * * *

REEXAMINATION CERTIFICATE (437th)
United States Patent [19]

[11] B1 4,064,744

Kistler

[45] Certificate Issued Dec. 17, 1985

[54] STRAIN SENSOREXTENSIOMETER

[75] Inventor: Walter P. Kistler, Redmond, Wash.

[73] Assignee: Kistler-Morse Corporation, Bellevue, Wash.

Reexamination Request:
No. 90/000,653, Oct. 18, 1984

Reexamination Certificate for:
Patent No.: 4,064,744
Issued: Dec. 27, 1977
Appl. No.: 692,977
Filed: Jun. 4, 1976

[51] Int. Cl.⁴ .................... G01B 7/16; G01L 1/22
[52] U.S. Cl. .................... 73/766; 73/777; 73/781; 73/849; 73/862.65; 338/6
[58] Field of Search .................... 73/862.65, 781, 782, 73/855, 766, 777, 849; 338/5, 6

[56] References Cited
U.S. PATENT DOCUMENTS 2,801,388  7/1957  Ruge .
3,559,467  2/1971  Gurol et al. .
3,743,041  7/1973  Videon .
3,866,157  2/1975  Birkholtz .

FOREIGN PATENT DOCUMENTS 988667  5/1951  France .

Primary Examiner—James L. Rowland
Assistant Examiner—Jeffery A. Hofsass

[57] ABSTRACT

A strain sensor or extensiometer with electrical output designed to measure relative displacements between two axially spaced points on a stressed structure comprising an elongated body with two end sections and a centrally located flexible beam extending in a direction perpendicular to the longitudinal axis of the sensor body. Relative displacements of the end sections generate two opposing symmetrical torques at the ends of the beam. These torques or bending moments are impressed onto the beam through two sets of flexible bridges which are symmetrically located but unequally spaced on opposite sides of the beam. These two torques or couples cause the beam to bend evenly over its entire length. Resistance strain gages bonded to both sides of the beam at its center measure this bending.

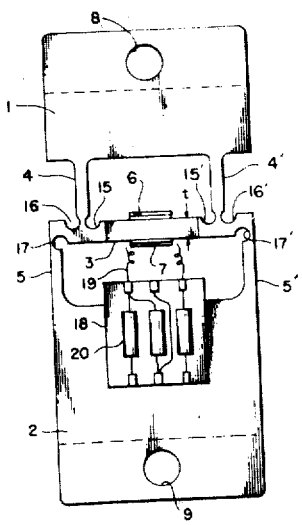

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1-9 and 11 is confirmed.

Claim 10 is cancelled.

* * * * *